(12) United States Patent
Stopel et al.

(10) Patent No.: US 8,831,637 B2
(45) Date of Patent: Sep. 9, 2014

(54) METHOD OF PROVIDING LOCATION BASED SERVICE INFORMATION

(75) Inventors: Dima Stopel, Herzliya (IL); Vadim Kuper, Yokneam Ilit (IL); Adi Ben Dayan, Rishon le Zion (IL)

(73) Assignee: Microsoft Corporation, Redmond, WA (US)

( * ) Notice: Subject to any disclaimer, the term of this patent is extended or adjusted under 35 U.S.C. 154(b) by 291 days.

(21) Appl. No.: 13/230,868

(22) Filed: Sep. 13, 2011

(65) Prior Publication Data

US 2013/0065613 A1     Mar. 14, 2013

(51) Int. Cl.
*H04W 24/00* (2009.01)

(52) U.S. Cl.
USPC .............. 455/456.3; 455/456.1; 455/456.2; 455/457; 455/404.2

(58) Field of Classification Search
CPC ..... H04W 64/00; H04W 84/045; H04W 4/02; H04W 88/08; H04W 60/00; H04W 8/26; H04W 4/20; H04W 4/021; H04W 4/206; H04L 67/18
USPC .............. 455/456.1, 456.2, 456.3, 404.2
See application file for complete search history.

(56) References Cited

U.S. PATENT DOCUMENTS

| 7,116,985 | B2 | 10/2006 | Wilson et al. |
| 7,315,259 | B2 | 1/2008 | Sacks |
| 7,890,576 | B2 | 2/2011 | Button et al. |
| 2002/0155844 | A1 | 10/2002 | Rankin et al. |
| 2003/0008619 | A1 | 1/2003 | Werner |
| 2007/0168524 | A1 | 7/2007 | Chao et al. |
| 2007/0268985 | A1 | 11/2007 | Ry et al. |
| 2008/0140840 | A1 | 6/2008 | Hamilton et al. |
| 2009/0326810 | A1 | 12/2009 | Callaghan et al. |
| 2010/0279706 | A1 | 11/2010 | Dicke |
| 2012/0202514 | A1* | 8/2012 | Kadirkamanathan et al. ........... 455/456.1 |

OTHER PUBLICATIONS

Ken C. K. Lee et al; Efficient Valid Scope for Location-Dependent Spatial Queries in Mobile Environments; Journal of Software; vol. 5; No. 2; Feb. 2010; pp. 133-144.
Akinori Asahara et al; Locally Differential Map Update Method with Maintained Road Connections for Telematics Services; Mobile Data Management Workshops, Apr. 27-30, 2008, http://ieeexplore.ieee.org/stamp/stamp.jsp?tp=&arnumber=4839079.
"International Search Report", Mail Date: Jan. 31, 2013, Application No. PCT/US2012/050642, Filed date: Aug. 13, 2012, pp.-11.

* cited by examiner

*Primary Examiner* — Kathy Wang-Hurst
(74) *Attorney, Agent, or Firm* — Steven Spellman; Jim Ross; Micky Minhas

(57) ABSTRACT

An embodiment of the invention provides a location based service (LBS) that updates a first version of information provided a mobile terminal responsive to a geo-query relative to a second, later version of information responsive to the geo-query by transmitting portions of the second version to the mobile terminal rather than all of the second version.

18 Claims, 2 Drawing Sheets

METHOD OF PROVIDING LOCATION BASED SERVICE INFORMATION

TECHNICAL FIELD

Embodiments of the invention relate to providing location based service (LBS) information to mobile communication terminals.

BACKGROUND

Present day communication systems support a rich menu of different voice, video, text and data communication services between mobile and stationary communication terminals and the people who use them. In addition, they support internet connectivity and a growing variety of location based services (LBSs). An LBS provides a person with information, entertainment and/or communications via an audio and/or visual interface of a mobile terminal which the person is using and carrying, responsive to a current geographical location of the person. The mobile terminal may be any of today's ubiquitous portable communication accessories, such as for example, a smart phone, a personal digital assistant (PDA), a laptop, or a workbook. Unless specified otherwise, information is understood to be used generically to include information, entertainment, and/or data that may be provided by an LBS.

The person's geographical location is typically determined from a location provided by any of various wireless location technologies of the mobile terminal. The location technologies include, by way of example, those employed by global navigation satellite systems, such as the global positioning satellite (GPS) system, mobile telephone networks, and/or Wi-Fi and may be automatic and/or require performance of a check-in procedure by the person.

Relevant LBS information provided or available to a person from a LBS via his or her mobile terminal may comprise information regarding manmade and/or natural features, hereinafter also referred to as venues, of an environment, which are, generally, within a limited geographical region and that he or she can physically access within a relatively short term period of time. Venues provided by the LBS, may, also be for a geographical region in which a person is not currently present but for which the person is interested in receiving information independent of distance of the geographical region from the person's current location. Relevant information provided to a person by his or her LBS may also comprise information regarding locations of other persons, which locations may or may not be accessible within a short period of time by the person requesting the information.

Typically, the information is provided by a server in a communication network in response to requests that the network receives from the person and in response to communications that the network receives which provide the person's location. The requested information may, by way of example, be for a local road map, with or without visual and/or audio aids for using the map to drive from the person's current location to a desired destination, or for locations of restaurants, stores, theaters and/or other desired venues within walking or driving range of the person. The information may also comprise alerts, and/or reminders, for example, to acquire or redeem coupons, or to attend to desired errands at particular venues within a predetermined distance from the person's current location. Requests for information relevant to a geographical location transmitted to an LBS are also referred to hereinafter as "geo-queries".

The relevant information is, by definition, location dependent and is of course subject to change as the person moves and changes his or her location. Relevant information may also be time dependent and change, or become "stale", with time of day, or as the environment in which the person is located changes over time. For example, information regarding an opportunity to purchase tickets to a given showing of a movie at a theater within walking distance of a person may change and become obsolete if at a time at which showing the movie begins, the opportunity lapses. Or, information indicating that a miniature golf range is open may change if upon onset of a summer rain squall, the golf range closes to visitors. The information may also change as needs and preferences of a person change. For example, a person who geo-queried an LBS to provide addresses for two sidewalk Italian restaurants nearest to her current location may, if it begins to rain, determine that she can delay the Italian restaurant and submit an urgent priority request for a location of a nearest store that sells umbrellas.

To provide an acceptable quality of service in response to a client's geo-queries, an LBS typically transmits amounts of information to a mobile terminal, such as a smart phone, that may be comparatively very large relative to the device's memory and information processing resources. The amount of information may also be large relative to a communication bandwidth that the device supports for receiving the information. In addition, determining the device's geographical location using GPS signals, or signals from a mobile telephone network is energy intensive. Repeatedly updating the LBS with the device's geographical location can draw down the device's battery relatively quickly. Repeated location updating and geo-querying may also be relatively expensive.

SUMMARY

An aspect of an embodiment of the invention relates to providing a relatively efficient method of providing and updating location based information to a client mobile terminal and providing an LBS that uses the method. The method is relatively conservative in its use of bandwidth, and/or consumption of client energy, and/or use of client memory, and/or information processing resources. In the discussion that follows reference to a client is understood to refer to a mobile terminal or to a person operating the mobile terminal. For example, reference to client energy, memory, processing resource, or reception or transmission of information may appropriately refer to a feature or activity of the client's mobile terminal or to an activity of a person operating or mediated by the mobile terminal.

According to an embodiment of the invention, a response that an LBS provides a client comprising information to answer a geo-query is associated with a plurality of variables that characterize the response and information included in the response. The variables may conveniently be thought of as components of a response identity "vector", hereinafter referred to as a "Response-ID". The components are used to manage communications between the client and the LBS to moderate bandwidth that a communications network allocates to support the communications, and/or energy consumed in acquiring geographic locations for the client, and/or appropriation of client memory, and/or processing resource. In an embodiment of the invention, the components optionally comprise an entity tag, referred to as an, "ETag", a list of at least one geographic "Tile ID", a "Tarry Time", an "Expiration Date", and a "Range". A component of the Response-ID may be determined by the client, optionally in a geo-query, and/or by the LBS responding to a geo-query. The Response- ID may be comprised in a header or data payload of a packet or packets transmitted to the client from a server in the network to deliver information in the response.

The ETag component of the Response-ID is determined as a function of the information included in the response transmitted to the client and operates as an identifier or label that "fingerprints" the information as a particular version of the information. A version of the information that differs in any way from the particular version transmitted to the client is labeled in accordance with an embodiment of the invention with a different ETag.

ETags in accordance with an embodiment of the invention are used to determine if there is a difference between information provided a client in a first response to a given geo-query from information available to the LBS to provide a second response to a later submission by the client of substantially the same given geo-query. If the ETags for the first and second responses are different, and the information in the first response is stored in the client memory, in the second response the LBS may provide the client with substantially only information needed to update the stored information. Upon updating the stored information, the client assigns the second ETag to the updated version of the information. Transmitting information in the second response to the client that is usable to update the stored information rather than transmitting all the information reduces bandwidth used in responding to the second geo-query.

The "Tile ID List" component of the Response-ID lists at least one code, a Tile ID, identifying a geographic tile defined by a border that designates a location and spatial extent of a specific geographical region associated with the information in the response to the client. In accordance with an embodiment of the invention, the LBS uses Tile IDs as indices to monitor and configure location, size and resolution of tiles associated with information that the LBS provides the client to moderate an amount of the information or a frequency with which it is provided.

The Tarry Time component of the Response-ID defines a period of time for which the information included in the response by the LBS is considered to be of sufficient relevance to be stored and to remain stored in client memory.

The Expiration Date component of the Response-ID defines a date and a time at which validity of information provided by the LBS in a response to a given geo-query by the client and stored in client memory, is considered to expire and should be revalidated to determine if it is currently accurate. In accordance with an embodiment of the invention, the ETag associated with the information to be revalidated is checked against an ETag associated with information currently available to the LBS, usually substantially at the expiration date, to respond to the same given geo-query. If the ETags are the same, the information is revalidated. If the ETags are not the same, the LBS sends the client information needed to update the stored information rather than a complete updated copy of the stored information.

The Range component of the Response-ID optionally provides a maximum distance between a current location of the client and the location of a tile identified by the Tile ID List component of the Response-ID for which the information in the response associated with the tile is considered relevant. In an embodiment of the invention, Range may be a function of direction. For example, range may be larger in a direction in which a client is moving and smaller in a direction opposite to the client's direction of motion. Information determined to be irrelevant because it is "out of range" is deleted from, or not stored, in client memory.

In the discussion, unless otherwise stated, adjectives such as "substantially" and "about" modifying a condition or relationship characteristic of a feature or features of an embodiment of the invention, are understood to mean that the condition or characteristic is defined to within tolerances that are acceptable for operation of the embodiment for an application for which it is intended.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical structures, elements or parts that appear in more than one figure are generally labeled with a same numeral in all the figures in which they appear. Dimensions of components and features shown in the figures are chosen for convenience and clarity of presentation and are not necessarily shown to scale.

DETAILED DESCRIPTION

Figure 1:
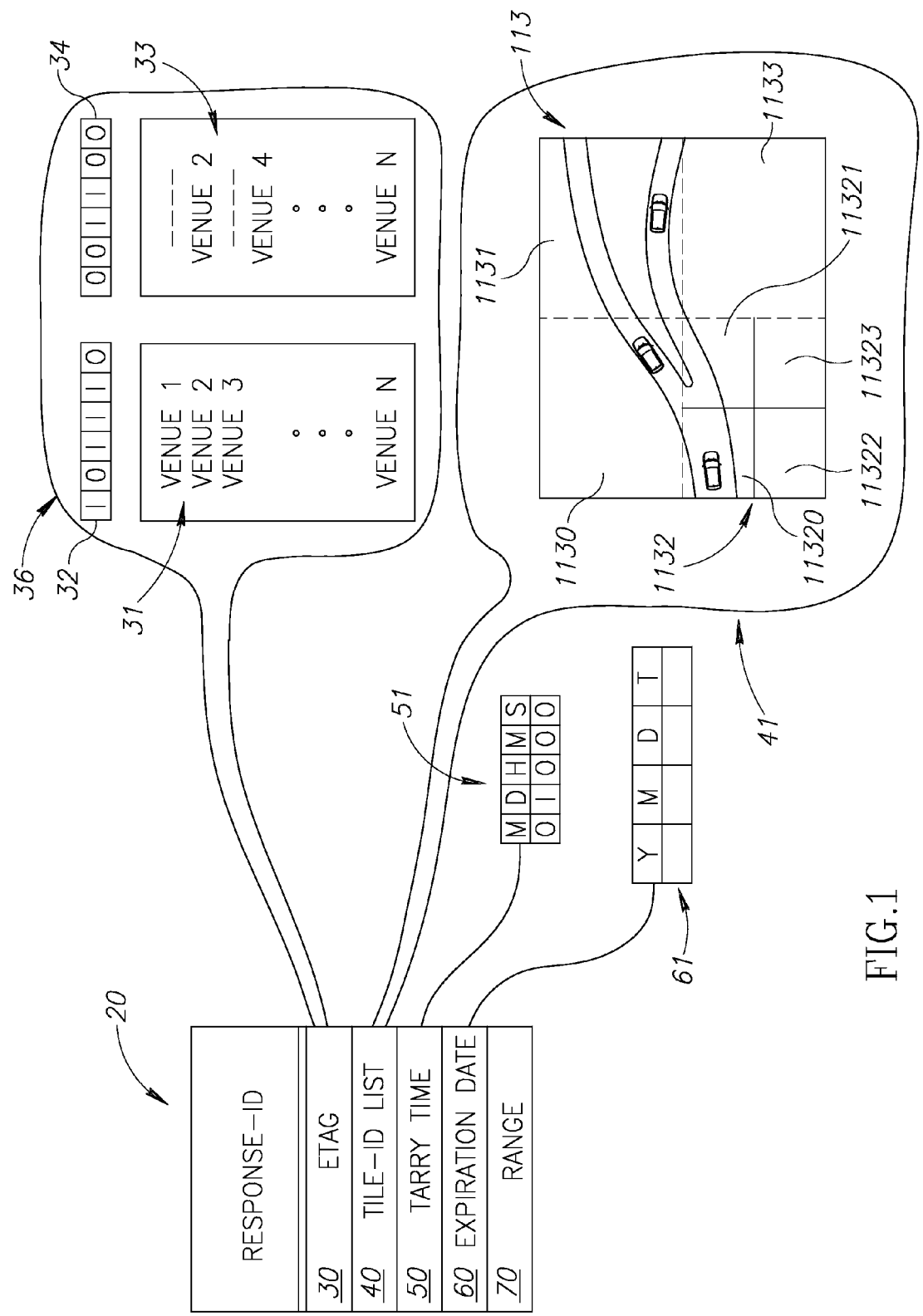
FIG. 1 schematically shows a Response-ID that characterizes a response to a geo-query that an LBS provides a client in accordance with an embodiment of the invention.
Figure 2:
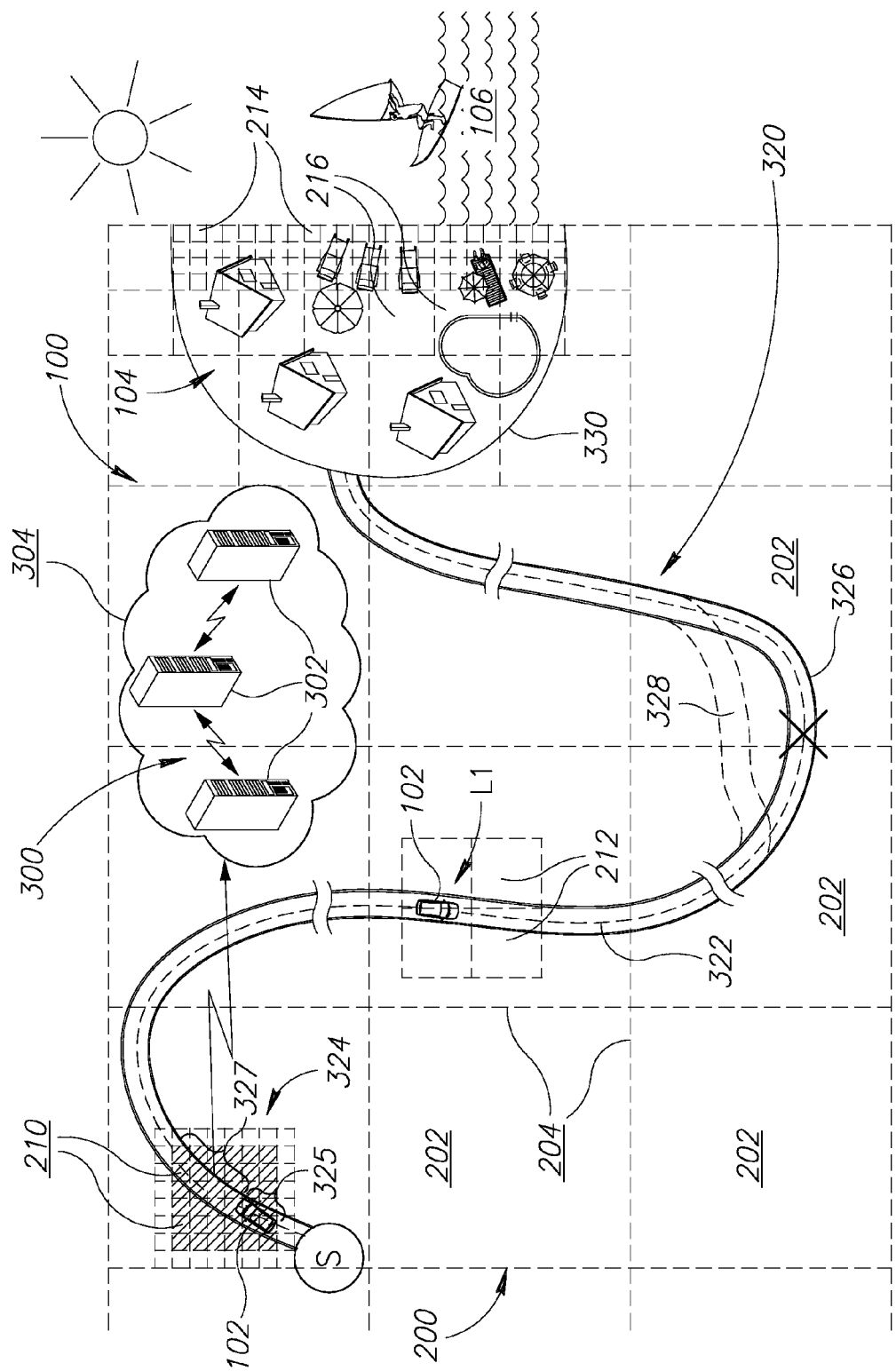
FIG. 2. Schematically shows a map of a region through which a person travels and for which the person receives information responsive to geo-queries that she submits to an LBS, in accordance with an embodiment of the invention.

In the following detailed description, a Response-ID vector in accordance with an embodiment of the invention is schematically shown in FIG. 1. Aspects of components of the vector and their uses are discussed with reference to the figure. FIG. 2 schematically shows a person traveling to a vacation spot. Use of components of Response-ID vectors similar to that shown in FIG. 1 to provide the person with LBS information during the person's trip, and upon the person reaching the vacation spot, are discussed with reference to the figure.

FIG. 1 schematically shows a Response-ID vector 20 in a form of a column vector having optionally five components 30, 40, 50, 60, and 70, respectively an ETag, a Tile ID List, a Tarry Time, an Expiration Date, and a Range. The Response-ID characterizes information in a response by an LBS to a given geo-query submitted by a client to the LBS, in accordance with an embodiment of the invention.

ETag component 30 of Response-ID 20 labels information provided by the LBS at a given first time in response to the geo-query as a particular version of the information. The ETag optionally comprises a string of data determined using any of various coding algorithms. An ETag in accordance with an embodiment of the invention may for example be determined similarly to the way in which error correcting codes are determined in telecommunications and information theory. Optionally an ETag comprises a concatenation of select bits from a data string representing the information transmitted to the client. Optionally an ETag comprises a date stamp that labels a date at which the information was assembled.

If the information available to the LBS to answer the same geo-query by the same client at a second time later than the first time is changed in any way relative to the particular version of the information transmitted in the response at the first time, the changed information is considered a new version of the information. The new version is assigned a new ETag different from the ETag labeling the version of the information transmitted at the first time.

In FIG. 1 A list 31 shown in an inset 36 and comprising, venue-1, venue-2 . . . venue-N, labeled with, an optionally binary, ETag 32, is assumed by way of example to be the information provided to the client by the LBS at the first time in response to the client's given geo-query. The list, together with its ETag 32, is assumed to be stored in the client memory (not shown). At a later, second time, a list 33 comprising venue-2, venue-4 . . . venue-N is available to the LBS to respond to the same geo-query by the same client. List 33 is changed with respect to list 31 and is missing venue-1 and venue-3. List 33 is therefore labeled with an, optionally binary ETag 34 different from ETag 32.

In an embodiment, if at the second time the client attempts to access stored list 31 or submits the given geo-query to the LBS again, the client transmits the geo-query and ETag 32 to the LBS. The LBS compares ETag 32 to ETag 34, and determines that they are different and that therefore list 31 stored in the client memory is not up to date. To provide up to date information to the client, in accordance with an embodiment, the LBS determines a difference between list 31 and list 32 and transmits to the client information defining the determined difference rather than transmitting all of list 33 as a replacement for list 31. The difference, which in the current example is the absence of venue-1 and venue-3 in list 33, enables the client to amend stored list 31 so that it is identical to list 33. Upon updating stored list 31, the client assigns ETag 34 as the ETag for the stored list. Transmitting substantially only updating information to the client rather than all of list 33 reduces communication bandwidth used to provide the client with an updated response to the given geo-query.

In an embodiment of the invention, the LBS determines a difference between "first" information responsive to a geo-query, which is transmitted to a client at a first time, and "second" information available for transmission to the client at a second time by requesting information from the client sufficient to determine the difference. For example, in an embodiment of the invention, information defining each venue provided to a client in response to a geo-query may itself be labeled by an ETag. To determine a difference between the first information that the client has and the second information available at the LBS, the LBS may request a list of the venue ETags in the first information and compare it to venue ETags in the second information. A difference in the ETags associated with the first information and the ETags associated with the second information indicate a difference between the first and second information.

Optionally, if information provided clients of the LBS is labeled with error correcting type ETags that are calculated similarly to a manner in which error correcting codes in telecommunication applications are calculated, a comparison of a first ETag labeling first information with a second ETag labeling second information may be sufficient to define a difference between the first information and the second information. For example, error correcting ETags in accordance with an embodiment of the invention, may be used to determine where first and second strings of data representing respectively the first information and the second information differ. The LBS may update the first information by transmitting to the client information sufficient to modify that portion of the first string that differs from the second string so that the two strings are identical rather than by transmitting all of the second string to the client.

Tile ID List, component 40, lists at least one Tile ID that identifies a particular tile or a plurality of particular tiles comprised in a grid of, optionally nested tiles, which segment a large extended geographical area into different, adjacent geographical regions. Each tile in the grid is defined by a border that designates a location and spatial extent of a specific geographical region in the extended geographical area and is associated with information that relates to and/or locates natural and/or manmade features within the region designated by the tile's border. The tile is characterized by a spatial resolution at which details of the features are represented by information associated with the tile. In an embodiment, each nested tile has a spatial resolution greater than a tile in which it is directly nested by a factor equal to a ratio of the area of the nesting tile divided by the area of the nested tile.

The at least one Tile ID in the Tile ID List in Response-ID 20 indicates that information provided in the response provided by the LBS is associated with the geographical region or regions identified by the at least one Tile ID in the Tile ID List. The information in the response is configured responsive to the spatial resolution with which features in the geographical region are represented by information associated with the at least one tile identified in the Tile ID List.

Optionally, the grid of tiles comprises a Bing Maps Tile System (BMTS) in which each tile is square, and except for a smallest tile is partitioned into four nested tiles. Each given tile is designated by an integer number Tile ID referred to as a "Quadkey". The four nested tiles that partition a given tile are each designated by the integer number Quadkey of the nesting tile plus a numeral 0, 1, 2 or 3 respectively added as a least significant digit to the Quadkey of the nesting tile. The additional least significant numeral in the order, 0, 1, 3, or 2, is added to the nesting tile Quadkey to respectively designate a given nested tile in clockwise order of the position of the nested tile being designated starting from the upper left corner of the nesting tile. By way of example, an inset 41 schematically shows a Bing tile 113 nesting tiles identified by Quadkeys 1130, 1131, 1132, and 1133. Tile 1132 is shown partitioned into nested tiles identified by Quadkeys 11320, 11321, 11322, and 11323.

In an embodiment of the invention, information provided to the client by the LBS in response to a geo-query is determined on a basis of the client's current need to know, and/or an anticipated need to know. Current need to know information comprises information provided by the LBS in response to the geo-query that is associated with at least one "occupied" or "unoccupied" tile, which has a size and resolution appropriate for providing the information. An occupied tile is a tile in which the client is currently physically present. An unoccupied tile associated with a geo-query is a tile, in which the client is not currently physically present, but which the client specifically identifies in the geo-query and for which the client requests information. Anticipated need to know information comprises information associated with an unoccupied tile that is not explicitly specified in a geo-query but for which the LBS or the client expects to be interested in accessing information while occupying a different tile. Anticipated need to know information, in accordance with an embodiment of the invention may for example comprise information associated with an unoccupied tile that a client is expected to occupy within a relatively short period of time as a result of the client's motion.

In an embodiment of the invention, the client determines location, size and/or spatial resolution of an occupied or unoccupied tile to enable the information to be transmitted at a relatively small bandwidth cost and relatively moderate use of client resources. Optionally, the LBS determines, or contributes to determining, size and spatial resolution of an occupied tile and/or an unoccupied tile.

For example, tile size and/or spatial resolution may be determined by the client and/or the LBS responsive to a constraint, such as a cost and/or a bandwidth constraint, determined in accordance with an expense and/or bandwidth budget set to limit responses to geo-queries. By way of another example, in response to a geo-query for locations of venues of a given type that includes a client specification for a tile size, the LBS may amend the specification and provide information for a larger than the specified tile if the specified tile does not include a venue of the given type or a sufficient number of the given type of venues. By providing information for the larger tile, the LBS may reduce a number of times the client accesses the LBS for the same information. In an embodiment, the client and/or the LBS extrapolates motion of the client to determine at least one tile that a client is expected to occupy and provides anticipated need to know information responsive to the expected occupancy.

The Tarry Time, component 50, of Response-ID 20 defines a period of time for which the information provided by the LBS is considered to be of sufficient relevance to remain stored in client memory. Depending upon the type of information requested in a geo-query, Tarry Time may vary in duration.

For example, a geo-query requesting wind conditions at a wind surfing beach submitted to an LBS may be associated with a Tarry Time of a few hours determined by a time period extending from a time at which the geo-query is submitted to nightfall. On the other hand, a geo-query for stores offering a sale on shoes may have a Tarry Time duration of a week, during which shoe stores in a city hold a traditional sales week.

A Tarry Time data table 51 schematically shows options, for setting Tarry Time duration in M (months), D (days), H (hours), M (minutes), and S (seconds) for information provided by the LBS. By way of example, table 51 specifies a Tarry Time of 1 day. Tarry Time duration equal to zero, that is all options M, D, H, M, and S, set to zero, determines that the information is for a "onetime presentation" upon receipt, and precludes the information being stored in client memory. A very large Tarry Time, for example M=100, may cause the information to be stored until the client deletes it.

In an embodiment of the invention, a client can actively determine Tarry Time duration for information requested in a geo-query by specifying the Tarry Time in the geo-query. Optionally, the LBS determines Tarry Time duration. For example, a weather report provided by the LBS for a city may automatically be assigned a default Tarry Time of a day.

The Expiration Date, component 60, of Response-ID 20 defines a date and time at which validity of information provided by the LBS to a given geo-query for storage by a client is considered to expire and should be revalidated to determine if it is currently accurate. The date and time may optionally be defined by Y (year), M (month), D (day), and T(time) as indicated in an exemplary table 61 shown in FIG. 1.

Expiration Date is different from Tarry Time 50. Information provided by a LBS, in accordance with an embodiment of the invention having an extended Tarry Time 50 duration may be subject to a number of expiration dates during the Tarry Time period for which the information is stored in the client's memory. For example, a woman vacationing in a city may geo-query the LBS for visiting hours at art museums in the city. The woman may have indicated in the geo-query, or in previous communications with the LBS, that she will be in the city for a week, as a result of which the LBS provided the museum information, identified with an appropriate ETag, with a Tarry Time of a week. Optionally, the LBS did not assign the Tarry Time to the information but the desired Tarry Time was set and assigned to the ETagged information by the client upon receipt of the museum information.

However, since museum opening hours change on a daily basis, the LBS assigned the information an Expiration date as a date of a next morning after provision of the information. Upon updating the information the next morning, the LBS assigns the information a new ETag, and resets the Expiration date for the next subsequent morning. The museum information having a Tarry Time of a week is updated every day of the week during the woman's stay in the city.

The Range, component 70, of Response-ID 20 provides a maximum distance between a current location of the client and the location of a tile identified by the Tile ID component of Response-ID 20 for which the information in the tile is considered relevant. Information determined to be irrelevant because it is "out of range" is deleted from client memory.

For example, assume the client is driving along a highway and sends a geo-query for locations of rest areas to the LBS. The geo-query may specify, or the LBS may determine that the information is to be provided with a Range equal to a distance the client is expected to travel in about twenty minutes. Then, if the client is driving at 60 kph (kilometers per hour) the Range is equal to 20 km. As a result, the LBS may provide the information for occupied tile sizes having a side length of about 20 km. And upon leaving an occupied tile for which the rest area information is provided, and traveling a distance 20 km away from the tile, the information associated with the tile is deleted. It is noted by way of example, for situations in which the LBS determines the Range, it may do so responsive to past behavior of the client and/or statistical behavior of travelers on the highway.

FIG. 2 schematically shows a geographical region 100 through which a person (not shown), hereinafter also referred to as a "vacationer" drives a car 102 from a start location "S" to vacation in a coastal vacation village 104 bordering an ocean 106. Geographical region 100 is overlaid by a grid 200 of nested, optionally BMTS geographic tiles 202 that are identified by Quadkeys. Some relatively large, low resolution tiles 202 comprised in the grid are shown in FIG. 1. Tiles 202 have borders indicted by dashed lines 204.

The vacationer driving car 102 is a client of an LBS 300. LBS 300 is schematically shown including a distributed network of servers 302 that communicate between themselves and clients of the LBS via the internet 304 to provide clients of the LBS with responses to geo-queries. Processors in the servers and/or the clients' mobile terminals, are programmed with instruction sets that use Response-ID vector components, in accordance with an embodiment of the invention, to provide the clients' mobile terminals with the responses. During the trip to vacation village 104 and during a stay in the village, LBS 300 responds to geo-queries transmitted to the LBS by the vacationer with information that the LBS transmits to the vacationer's mobile terminal (not shown).

Upon planning her trip, the vacationer transmitted a geo-query to the LBS requesting a road map showing an advised route she should drive to get to the vacation village. LBS 300 responded by transmitting a response to her mobile terminal comprising information having a map 320 showing a major roadway 322 to be used. The response was associated with a Response-ID 20 (FIG. 1) having an ETag labeling the information. The map, hereinafter also referred to as an "overview map 320", showed features in geographical region 100 at a level of detail provided by the relatively large, low resolution tiles 202 schematically shown in FIG. 2, in order to show all of roadway 322 from start S to vacation village 104. Tile ID List 40 in Response-ID 20 (FIG. 1), listed Quadkeys of all tiles, that is all large tiles 202 shown in FIG. 2, which the LBS used to provide overview map 320 that displays roadway 322.

An LBS 300 instruction set, comprised in a server 302 and/or in the vacationer's mobile terminal (not shown estimated that the trip from S to vacation village 104 would last about three days and assigned a Tarry Time to overview map 320 of four days to provide for a margin of error in the estimated trip time. As various sections of roadway 322 and nearby access roads (not shown) and associated traveler facilities were undergoing repair that might result in changes to the roadway on a daily basis during the person's trip, LBS 300 set an Expiration Date for roadway map 320 to a date of a next day following a date at which the map was transmitted to the vacationer. The Range component of Response-ID 20 is irrelevant for the overview map, since the map is meant to provide the vacationer with a complete travel route independent of the vacationer's location along the route.

On setting out at a time $t_0$ from S to drive to vacation village 104, the vacationer geo-queried LBS 300 for a local, detailed map of roadway 322 and the roadway environs that designated locations for gas stations, rest areas, restaurants, and motels along the roadway. In response, rather than transmit information defining a detailed map showing all of roadway 322, its environs and venues, LBS 300 transmitted a relatively high spatial resolution local map to the person showing features (not shown) for only a relatively small area 324 of geographical region 100 that included a location of the person's car 102, which at time $t_0$ is in a neighborhood of S. The local map was defined by information associated with relatively small, high spatial resolution tiles 210 shown shaded.

The information defining the high resolution local map transmitted to the vacationer by LBS 300 included a Response-ID 20 having an ETag, and a Tile ID List listing Quadkeys of shaded tiles 210 that were used to provide the map. At times subsequent to time $t_0$, as the person drove the car along roadway 322, LBS 300 updated the high resolution local map, in accordance with an embodiment of the invention, responsive to locations of the car determined by mobile telephone networks and/or GPS.

In accordance with an embodiment of the invention, Range 70 in Response-ID 20 for the local map generated using information associated with tiles 210 was defined as a function of direction responsive to determination of need to know and anticipated need to know information. The vacationer needed detailed information in a relatively small area around a current location of the vacationer's car 102 and was anticipated to need detailed information in a direction along a forward direction in which the car was moving along roadway 322. For areas along roadway 322 behind the car, in a backward direction along roadway 322 opposite to the car's direction of motion, detailed information was not expected to have high relevance. Therefore, LBS 300 determined Range for the local map and venue information it provided to comprise a "Forward Range" in a direction along roadway 322 in which car 102 was moving, or if stationary expected to move, longer than a Backward Range in a direction along roadway 322 opposite to the direction in which the car was moving or expected to move.

As a result geographical area 324 defined by tiles 210 extends from a location of car 102 a greater number of tiles 210 and therefore longer distance along roadway 322 in a direction towards vacation village 104 than in the opposite direction along the route. For tiles 210, Backward Range 325 in a direction along roadway 322 away from village 104 is optionally equal to about twice a diagonal length of the tiles and Forward Range 327 is optionally about six diagonals in a direction along the route towards vacation village 104. As car 102 moves along roadway 322 tiles behind the car move out of the Background Range and tiles along roadway 322 in front of car 102 move into the Forward Range.

In accordance with an embodiment of the invention, Forward and Backward Ranges 327 and 325 respectively, may be set to various distances by the vacationer and/or LBS 300. For example, the vacationer may set the Ranges responsive to a speed with which she might expect to travel along roadway 322. She may expect to travel at an average speed of about 90 kph (kilometers per hour) and set her Forward Range equal to about a half hour of travel and her Backward Range equal to about a distance she might travel in about 20 minutes. As a result, Backward Range 325 may be equal to about 30 km and Forward Range 327 equal to about 45 km. Alternatively LBS 300 may determine Forward and Backward Ranges 327 and 325 responsive to statistics accumulated for drivers using roadway 322. Or the LBS might set the Ranges responsive to real time speed with which the vacationer travels along roadway 322 or responsive to past travel histories of the vacationer.

In accordance with an embodiment of the invention, an instruction set of LBS 300 optionally comprised in the mobile terminal of the vacationer may check the location of car 102 at a frequency substantially equal to a speed with which car 102 moves divided by a distance equal to about a diagonal length of a tile 210. The LBS optionally determines the car's speed from changes in the location of the car "reported" to the LBS, divided by differences in time between reports. At each check of the car's location, LBS 300 receives the ETag labeling the version of the map in the vacationer's mobile terminal and determines which tiles 210 have moved out of the Backward Range and which tiles have moved into the Forward Range and updates the detailed local map of roadway 322 in the neighborhood of car 102 along the roadway. Information associated with tiles 210 that have moved out of range is deleted from the vacationer's mobile terminal and information associated with tiles that have moved into range relevant to features of the environs and venues geo-queried by the vacationer is transmitted to the vacationer's mobile terminal. At each update, the LBS resets the ETag that identifies the detailed local map to a new, different ETag.

In an embodiment of the invention, each time the vacationer operates her mobile terminal to access anew the local map after exiting the map, the mobile terminal acquires the car's location and transmits the location and local detailed map ETag to LBS 300. In response, the LBS updates the loical detailed map as described above.

In accordance with an embodiment, the size and resolution of tiles used to provide a detailed local map for the vacationer may change with density of features and requested venues along roadway 322. For example, in the afternoon of her first day of driving to vacation village 104 at a time $t_1$, car 102 is located at location L1 along a stretch of road passing through a relatively sparsely settled area for which there are few gas stations, rest areas, restaurants and motels per kilometer distance along the route. As a result, for this stretch of road LBS 300 provides a detailed map at a resolution provided by optionally four relatively large tiles 212.

It is noted that whereas all tiles used to provide a local map at time $t_0$ have a same size, and all tiles 212 used to provide a local map at time $t_1$ have a same size, information provided by LBS 300 at a given time in response to a geo-query is not limited to information associated with tiles having a same size. The information may be based on tiles having different sizes. For example, when moving through a geographic region with changing density of features and venues of interest, LBS may at a given time provide information based on tiles having different sizes and spatial resolutions.

During the morning of the second day of her trip, at a date and time specified by Expiration Date 60 in Response-ID 20 (FIG. 1) information provided by LBS 300 defining the overview map 320 was scheduled to be checked to determine if it was up to date. At the Expiration Date time, the vacationer's mobile terminal transmitted the ETag in the overview map Response-ID to LBS 300. In the early morning prior to the Expiration Date time, a section 326 of roadway 322, schematically crossed out with an "X", was blocked to traffic so that it could be repaved, and traffic was directed to a detour 328, indicated in dashed lines, which bypassed section 326. As a result, LBS 300 assigned a new ETag to information it had available for overview map 320. Upon comparing the ETag received from the vacationer for the vacationer's version of the overview map with the ETag that LBS 300 had for the overview map, the LBS determined that the vacationer's version was out of date.

In accordance with an embodiment of the invention, rather than sending a complete updated version of overview map 320, the LBS transmitted the new ETag for the overview map and information needed to update the vacationer's version to agree with the LBS version. After receiving the updating information the vacationer's mobile terminal updated its version of the overview map and associated the updated map with the new ETag.

Upon reaching vacation village 104, the vacationer submitted a number of geo-queries including geo-queries for lists of theaters and their playlists, seashore restaurants and bars, and beaches that allowed windsurfing. Responses to the geo-queries were assigned respective ETags and a Tarry Time of a week to match the intended stay of the vacationer in the vacation village. Information providing the playlists was assigned an Expiration Date one day in the future from the date of the geo-query requesting the playlists and thereafter one day in the future from each time at which the playlists were last validated.

All the information was provided based on information associated with relatively small, high resolution tiles 214 along the village coast of ocean 106, where feature density in the vacation village is relatively high. For areas of vacation village 104 set back from the coast where feature density is relatively low, the information in response to the geo-queries was provided based on information associated with relatively large low resolution tiles 216.

At the Tarry Time assigned information defining a last updated detailed local map for a portion of roadway 322 ending at a geofence 330 marking entrance to vacation village 104, the detailed local map information was deleted. And at the Tarry Time of four days from a time at which the vacationer left starting region S, the overview map was deleted from the vacationer's mobile terminal.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to vacationers of the art. The scope of the invention is limited only by the claims

The invention claimed is:

1. A method of providing location based information to a mobile terminal, the method comprising:
receiving a geo-query from a mobile terminal at a first time;
labeling a first version of information responsive to the geo-query with a first ETag and transmitting the first version to the mobile terminal;
receiving the geo-query a second time;
labeling a second version of information available to respond to the geo-query at the second time with a second Etag;
determining that there is a difference between the first and second versions if there is a difference between the first and second ETags;
transmitting a response to the mobile terminal that includes only a part of the second version that is responsive to the difference and useable to update the retained information so that the updated information is substantially the same as the second version information.

2. The method according to claim 1 and comprising determining the difference responsive to the ETags.

3. The method according to claim 2 wherein determining the difference comprises determining portions of the retained information and the second information that differ.

4. The method according to claim 1 and comprising receiving information relevant to the retained information from the mobile terminal and determining the difference responsive to the received relevant information.

5. The method according to claim 4 wherein the relevant information comprises ETags identifying portions of the retained information.

6. The method according to claim 1 wherein the geo-query at the first time requests information for a first geographical region in which the mobile terminal has a current location.

7. The method according to claim 6 and determining the geographical region responsive to a range measured from the current location of the mobile terminal.

8. The method according to claim 7 wherein the range sets an upper limit to a distance from the current location for which the first information provides information.

9. The method according to claim 7 wherein the range is a function of direction from the current location.

10. The method according to claim 1 wherein the geo-query at the first time requests information for a first geographical region in which the mobile terminal is not currently located.

11. The method according to claim 10 wherein the mobile terminal is in motion and comprising determining the first geographical region as a region that includes an expected future location of the mobile terminal responsive to the motion.

12. The method according to claim 6 wherein the first information provides information associated with venues located in the first geographical region.

13. The method according to claim 12 wherein the first version information provides information associated with venues in a second geographical region larger than, and at least partially overlapping with the first limited geographical limited region.

14. The method according to claim 13 and determining a size of the second larger geographical region responsive to an amount of information transmitted to the mobile terminal.

15. The method according to claim 6 wherein the second version information provides information associated with venues in a second geographical region that at least partially overlaps the first geographical region.

16. A location base service (LBS) comprising at least one processor programmed with a computer executable instruction set executable to implement a method according to claim 1.

17. The LBS according to claim 16 wherein the at least one processor includes a processor in a mobile terminal and a processor comprised in at least one server.

18. The method according to claim 1 wherein the first and second ETags comprise an error correcting code generated responsive to content of the first and second versions respectively.

* * * * *